3,126,410
MIXED STEREOISOMERS OF NORCAMPHORIC ACID

Samuel C. Temin, Pittsburgh, and Melvin E. Baum, Monroeville, Pa., assignors to Koppers Company, Inc., a corporation of Delaware
No Drawing. Filed Feb. 21, 1961, Ser. No. 90,642
5 Claims. (Cl. 260—514)

This invention relates to the preparation of norcamphoric acid, cyclopentane-1,3-dicarboxylic acid, via the ozonation of norbornylene. In one specific aspect, it relates to a novel ozonation-oxidation method for converting norbornylene to a mixture of the cis and trans isomers of norcamphoric acid.

In recent years there has been considerable interest in the preparation of norcamphoric acid by ozonation. Robert H. Perry, in U.S. Patent 2,963,487, describes a process involving the ozonation of norbornylene in a non-participating solvent, such as ethyl acetate, at a temperature of about −75° C. to +25° C. to form a solid, solvent-insoluble polymeric ozonide which is oxidized with performic acid or molecular oxygen containing a catalytic amount of ozone to give the cis isomer of norcamphoric acid, cis-cyclopentane-1,3-dicarboxylic acid. Although Perry's patented process represents an effective route for the preparation of norcamphoric acid, the product obtained by that method is substantially all in the form of this cis isomer. Perry in J. Org. Chem., 24, 829 (1959) discloses a different process involving the ozonation of norbornylene in methanol at −70° C., and oxidation of the ozonation product with performic acid to give a product consisting essentially of cis-norcamphoric acid.

Quite surprisingly, we have discovered a novel method involving the ozonation of norbornylene to form a new immediate ozonation product. The air oxidation of this new ozonation product gives unexpectedly a mixture of the cis and trans isomers of norcamphoric acid, the weight ratio of cis to trans acid being about 6–10:1. The presence of appreciable portions of trans acid provides a useful product having a lower melting point than the pure cis isomer.

The lower melting point of the isomeric mixture is particularly significant when norcamphoric acid is converted to its useful derivatives, e.g. the simple diesters described and claimed in the copending application of S. C. Temin, Serial No. 34,649, filed June 8, 1960, now U.S. 3,041,369, and the polyesters made by the reaction of norcamphoric acid with an alkylene glycol, described and claimed in the copending application of S. C. Temin, Serial No. 56,635, filed September 19, 1960, now U.S. 3,041,314. The diesters and polyesters of norcamphoric acid are remarkably effective as plasticizers when admixed with thermoplastic resins, such as polyvinyl chloride, chlorinated polyethylene, polyvinyl butyral, polyvinyl acetate, polystyrene, styrene-butadiene copolymers, styrene-acrylonitrile copolymers, vinylidene chloride-acrylonitrile copolymers and the like, in an amount ranging between 10–120% by weight based on the weight of the resin.

One important criterion for the effectiveness of a given plasticizer is the low-temperature behavior of the plasticized resin. Low-temperature behavior is particularly important with respect to polyvinyl chloride resins because of the widespread commercial use of such resins. In the copending application of S. C. Temin, Serial No. 34,649, supra, it was noted that certain of the simple esters of cis-norcamphoric acid imparted superior low-temperature characteristics of polyvinyl chloride resins because of the stability and low melting point of the esters. We have found that the isomeric mixture of cis and trans acids obtained by our new method gives simple esters and polyesters which are even lower melting than those obtainable from pure cis-cyclopentane-1,3-dicarboxylic acid.

The pure cis isomer of norcamphoric acid melts at about 120.5°–121.5° C. and the dl trans acid melts at above about 980° C. Mixtures of the two acids, or their derivatives, exhibit the typical melting point depression common to mixtures of chemical substances. Thus, fifty-fifty mixtures of cis and trans norcamphoric acid begin to melt at below about 85° C.

Our new process represents a step forward in the art, since it provides a lower melting product which is converted with comparative ease into useful derivatives, including simple diesters and polyesters, which have melting points lower than those obtainable from the pure cis-norcamphoric acid. It is well known that the lower melting plasticizers impart better low-temperature stability characteristics to thermoplastic resins, particularly polyvinyl chloride resins. See D. N. Buttrey, "Plasticizers," Cleaver-Hume Press, Ltd., London, 1947, p. 73.

It is, therefore, an object of the present invention to provide a new method for making norcamphoric acid from norbornylene by an ozonation-oxidation technique. It is a further object to provide a method which, for the first time, gives as a product a mixture of the cis and trans isomers of norcamphoric acid.

In accordance with the invention, an aqueous medium capable of retaining norbornylene in suspension is provided. Norbornylene and ozone are simultaneously added thereto, preferably in substantially stoichiometric quantities. The ozone and norbornylene are permitted to react at temperatures up to about 55° C. to form a water-soluble ozonation product. The aqueous solution containing the ozonation product is contacted with an oxidizing agent, i.e. air or molecular oxygen, at a moderately elevated temperature, and the product, a mixture of the cis and trans isomers of norcamphoric acid, is recovered from the reaction mixture by conventional techniques, such as evaporation, recrystallization or distillation.

An important feature of our invention is the aqueous medium which is provided for the reaction between norbornylene and ozone. The Criegee mechanism of ozonation has now attained general acceptance, and according to it, ozonation solvents fall into one of two classes: (1) participating solvents which react with the so-called "zwitter" ion to form peroxidic products, and (2) non-participating solvents with which the "zwitter" ion does not react and therefore reacts with itself to form true ozonides or polyperoxides. The use of non-participating solvents for the ozonation of norbornylene and the resulting formation of a polymeric ozonide is described in U.S. Patent 2,963,847, issued to Robert H. Perry. Although water is considered to a participating solvent, in the presence of other classical participating solvents such as the lower alcohols, water does not serve as the reaction controlling solvent. Surprisingly, and in contrast with results reported using other solvent media, we have found that by providing a system wherein water is permitted to serve as the reaction controlling solvent, it is possible to get, by an ozonation-oxidation technique, a mixture of the cis and trans isomers of norcamphoric acid.

Thus, according to our invention, norbornylene is dispersed in an aqueous medium which contains water as the sole participating solvent. Dispersion can be accomplished by sufficient agitation of the reaction medium and the presence of an emulsifying or suspending agent for norbornylene such as polyoxyethylene alkyl phenols, e.g. octyl phenol condensed with five moles of ethylene oxide; polyoxyethylene fatty acids, e.g. oleic acid condensed with 12 moles of ethylene oxide; sodium alkyl sulfates, e.g. sodium lauryl sulfate; sodium dioctyl sulfosuccinate and the like. Alternatively, the dispersion can be effected solely by mechanical means with the use of a high-speed stirrer and suitable baffles in the reaction vessel. To promote the solubility of ozone and hydrocarbon in the aqueous medium, the medium can contain up to about 5% by weight, based on the weight of the reaction mixture, of an ozone inert non-participating solvent, preferably an aliphatic hydrocarbon such as hexane, heptane, pentane, methylcyclohexane and the like.

It is important for purposes of the present invention to add the norbornylene and ozone simultaneously to the aqueous medium. Since norbornylene (M.P. 45° C., B.P. 94° C.) is highly volatile and since its solubility in water is limited, simultaneous addition of the reactants becomes necessary in order to avoid a substantial loss of norbornylene, as is shown in comparative Example 2. The norbornylene is conveniently added in aqueous emulsion to the aqueous medium at such a rate to provide a reaction mixture containing a homogeneous dispersion of norbornylene in an amount ranging between 5 and 40% by weight. The important consideration is to provide a well-agitated dispersion and thereby permit intimate contact between the ozone and the norbornylene.

An oxygen containing gas is used as a carrier for the ozone during the reaction. The type of gaseous carrier and the concentration of ozone therein depends upon the type of equipment used. Certain generators provide a stream of ozone in air in concentrations ranging up to about 5% by weight. Others provide ozone in oxygen, the concentration of ozone ranging up to about 8% by weight.

To obtain high yields of product by the method of this invention, it is desirable to use at least about a stoichiometric quantity of ozone based upon the amount of norbornylene added simultaneously to the system (a 1:1 mole ratio). Mole ratios of higher than 1:1 can be used, but a large excess of ozone, viz: greater than about 2:1, is undesirable because of the danger of forming explosive mixtures of gases in the equipment. To avoid the waste of ozone, it is desirable to add the ozone at a rate not greater than the rate of absorption of the ozone by the reaction mixture.

The reaction between ozone and norbornylene is relatively rapid. The reaction time will, therefore, depend upon the starting quantity of norbornylene and the intimacy of contact between the ozone and norbornylene.

The reaction is conducted at atmospheric pressure, although higher pressures up to several atmospheres are often desirable to prevent the escape of the highly volatile norbornylene.

The reaction temperature ranges between about 15° C. to about 55° C. The use of higher temperatures is undesirable because of the volatility of the norbornylene at atmospheric pressure and the tendency for the ozone to undergo rapid decomposition at temperatures approaching 75–80° C. Operation at temperatures below those conveniently obtained with cooling water is possible, but generally the results obtained do not justify the increased equipment costs involved. It is preferable to conduct the reaction at ambient temperatures.

The reaction product of norbornylene and ozone using our novel suspension medium is, in contrast to that formed during the process of the Perry patent, a water soluble, low molecular weight product. Although we have not attempted the isolation of this product, we believe it to consist, at least partly, of a peroxide having the possible formula:

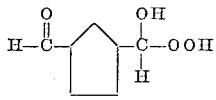

One of the important benefits of the process of the invention is the elimination of the necessity of isolating the intermediate ozonation product, which is a required step in the Perry process. Since the ozonation product of our new method is water soluble, it is conveniently converted in situ to norcamphoric acid. This conversion is accomplished after ozonation is complete by heating the resulting aqueous solution to a moderately elevated temperature below the boiling point of the solution, preferably between 50 and 90° C. and oxidizing by treating the solution with a stream of air or oxygen at a rate sufficient to saturate the reaction mixture. No adverse effect is occasioned by adding oxygen at a greater rate. The use of other conventional oxidizing agents, such as peracetic acid, performic acid, and the like, does not give as a product the stereoisomeric mixture obtainable by the method of the invention.

The time required for the oxidation of the ozonation product varies with the temperature of oxidation and the concentration of starting ozonation product, although conversion is generally complete in a period of 3–15 hours. After oxidation is complete the product norcamphoric acid is conveniently recovered by evaporating the reaction mixture to dryness and recrystallizing the crude residue from water, benzene, toluene, CCl$_4$ or mixtures thereof.

The crude reaction product thus obtained represents a yield of 60–80% based upon the norbornylene charged. The product is a mixture of the cis and trans isomers of norcamphoric acid, the amount of cis to trans being 6–10 parts cis for each part of the trans isomer.

In order to determine the composition of the mixture with respect to the isomer distribution, the following analytical chromatographic procedure can be conveniently used.

A 22 mm. I.D. glass column is packed with 34–38 cm. of 100 mesh silicic acid powder containing 44% by weight water as the stationary phase. A gradient mixture consisting of 1–8 volume percent of tertiary butyl alcohol in chloroform is used as the moving phase. A sample, 65–75 mg. dissolved in the initial gradient mixture is applied to the column, and the chromatograph is developed with the gradient mixture flowing at the rate of 0.8 ml./min. The transition from the initial to the final concentration in the gradient mixture is made with an automatic mixing and feeding device that accomplishes the change in a linear progression. The total eluate volume used amounts to about 400 ml. The eluate fractions are collected in 10 ml. volumes; one half of each fraction is titrated with 0.5 N alcoholic potassium hydroxide to determine the percent acid recovered in each fraction. The residual half of each fraction is evaporated to dryness, so that melting points and infrared spectra can be determined to characterize the cis and trans isomer fractions. We have made certain that isomerism does not occur on the column using pure cis norcamphoric acid as a control. Only cis acid was eluted and all was recovered.

The literature on the trans isomer gives varying melting points for the product, indicating that a pure product is difficult to obtain. Pospischill, Ber. 31, 1950 (1898), reported a melting point for the trans isomer of 87–88.5° C. Birch and Dean, J. Chem. Soc., 247 (1953) prepared a sample of purportedly pure trans isomer melting at 99.5–96.5° C. A chromatographic analysis by the foregoing procedure of a sample prepared by the Birch and Dean method resulted in the elution of both trans and cis acid. A composition corresponding to a mixture consisting of 90.2 weight percent of the trans isomer and 9.8 weight percent of the cis isomer was recovered. The chromatographically pure trans-cyclopentane-1,3-dicarboxylic acid melted at 98–99° C. As we noted, the cis isomer of norcamphoric acid melts at 120.5–121.5° C.

The foregoing chromatographic analysis was used to obtain samples to determine the melting points of trans and cis of norcamphoric acids and their mixtures. The pure acids were used to formulate stereoisomeric mixtures in order to show the advantageously low melting points of mixtures containing appreciable amounts of trans acid. The results are shown below in Table I.

TABLE I.—MELTING POINTS OF NORCAMPHORIC ACID STEREOISOMERS AND THEIR MIXTURES

| Mixture, Weight percent Trans | Mixture, weight percent Cis | Melting Point, Melting Range, Degrees D. |
|---|---|---|
| 100 | 0 | 98–99 |
| 90.2 | 9.8 | 95–96 |
| 86.9 | 13.1 | 94–95 |
| 79.7 | 20.3 | 90–93 |
| 74.6 | 25.4 | 88–92 |
| 68.7 | 31.3 | 85–88 |
| 66.7 | 33.3 | 85–89 |
| 55.8 | 44.2 | 84–91 |
| 44.2 | 55.8 | 86–95 |
| 27.4 | 72.6 | 99–109 |
| 22.5 | 77.5 | 102–112 |
| 12.3 | 87.7 | 112–117 |
| 0 | 100 | 121–122 |

Our invention is further illustrated by the following examples:

*Example I.—Ozonation of Norbornylene in Aqueous Emulsion*

A reaction vessel with entry tubes for two separate feeds was connected to gas washing bottles containing sodium arsenite solution to absorb unreacted ozone, and then to empty traps cooled to −70° C. to condense unreacted norbornylene. The two feeds were added simultaneously to the reactor containing 200 ml. of water at such a rate that approximately equimolar amounts of ozone and norbornylene were added. Moderate cooling with a water bath kept the temperature at 25–30° C. Then, an ozone-oxygen stream delivering 71.4 mg. ozone/min. and an emulsion of norbornylene in water containing 81.8 mg./ml. were added over a period of about 175 minutes, so that a total of 12.3 g. (0.256 m.) of ozone and 23.5 g. (0.250 m.) of norbornylene were added. The turbid mixture was then bubbled with nitrogen to remove ozone and norbornylene. Titration of the contents of the arsenite traps and of the norbornylene traps showed that 0.036 m. of ozone and 0.010 m. of norbornylene were unreacted. The amount of each component which had reacted was 0.220 m. and 0.240 m., respectively. The norbornylene loss was only 4.5%.

*Example II.—Ozonation of Norbornylene in Aqueous Emulsion*

To the stirred reaction vessel (described in Example I) containing 200 ml. of water and 287 ml. of an aqueous emulsion containing 23.5 g. (0.250 m.) of norbornylene there was fed at a temperature of 25–30° C. an ozone-oxygen stream until 1.6 g. (0.033 m.) of ozone (13.4% of theoretical amount required) had been delivered. Titration of the contents of the norbornylene trap showed that they contained 6.7 g. (0.072 m.) of norbornylene. Thus, after only about 13% reaction, the norbornylene loss was 29%. This example shows the necessity of simultaneously adding ozone and norbornylene to the reaction mixture.

*Example III.—Ozonation of Norbornylene in Aqueous Emulsion*

The procedure of Example I was followed with the exception that the reaction temperature was kept at 65° C. Titration of the contents of the norbornylene traps showed an 18% loss of the initial charge after the theoretical amount of ozone had been added. This example illustrates the relative importance of using only slightly elevated temperatures during the ozonation step.

*Example IV.—Oxidation of the Ozonation Product of the Invention*

An ozonate solution prepared as in Example I, from 9.4 parts of norbornylene, was bubbled with air at 0.5 l./min. for 14 hours while heating at 75° C. The resulting solution was evaporated to dryness on a steam bath. The colorless residue thus obtained, consisting essentially of an isomeric mixture of cis and trans norcamphoric acids, 15 parts, compares with the theoretical 15.8 parts.

Chromatographic analysis of the residue by the procedure hereinbefore described showed that the isomeric cyclopentane-1,3-dicarboxylic acids were present in the ratio of 9.6:1 parts, respectively, of cis and trans isomers.

*Example V.—Oxidation of an Ozonation Product Made in the Presence of a Competing Participating Solvent*

An ozonate solution was prepared as in Example I, with the exception that an 88/12 t-butyl alcohol-water azeotrope was used as an ozonation medium. The solution containing the ozonation product was treated with hydrogen peroxide-formic acid to give a product, the composition of which was determined by chromatographic analysis, having a ratio of cis to trans-cyclopentane-1,3-dicarboxylic acids of 143 parts to 1 part, respectively.

*Example VI.—Oxidation of an Ozonation Product Prepared in a Participating Organic Solvent*

An ozonation product was prepared according to the procedure of Perry, J. Org. Chem., 24, 829 (1959), by conducting the ozonation in methanol at −70° C., evaporating the methanol, and oxidizing the ozonation product in formic acid with hydrogen peroxide. The norcamphoric acid thus obtained had an isomeric composition of 97 parts cis isomer to one part trans isomer.

We claim:

1. Method of making a stereoisomeric mixture of cis and trans norcamphoric acid comprising providing an aqueous medium capable of retaining norbornylene in suspension and containing water as the sole participating solvent, simultaneously adding thereto norbornylene and ozone, the amount of ozone being at least a stoichiometric amount based on the amount of norbornylene, permitting the ozone and norbornylene to react to form a water-soluble low molecular weight ozonation product, heating the solution containing the ozonation product to an elevated temperature below the boiling point of the solution, oxidizing the ozonation product with a gas stream containing oxygen and recovering from the reaction mixture norcamphoric acid in the form of a mixture of cis and trans isomers.

2. Method of making a stereoisomeric mixture of cis and trans norcamphoric acid comprising providing an aqueous medium capable of retaining norbornylene in suspension and containing water as the sole participating solvent, simultaneously adding thereto norbornylene and ozone in substantially equimolar amounts, permitting the ozone and norbornylene to react to form a water-soluble low molecular weight ozonation product, heating the solution containing the ozonation product to a temperature between about 50–90° C., oxidizing the ozonation product with air and recovering from the reaction mixture norcamphoric acid in the form of a mixture of cis and trans isomers.

3. Method of making a stereoisomeric mixture of cis and trans norcamphoric acid, comprising providing an aqueous medium capable of retaining norbornylene in suspension and containing water as the sole participating solvent, simultaneously adding thereto norbornylene and ozone in substantially equimolar amounts, permitting the ozone and norbornylene to react at a temperature of 15–55° C. to form a water-soluble low molecular weight ozonation product, heating the solution containing the ozonation product to a temperature of about 50° C. and below the boiling point of the solution, oxidizing the ozonation product with a gas stream containing oxygen and recovering from the reaction mixture norcamphoric acid in the form of a mixture of cis and trans isomers.

4. Method of making a stereoisomeric mixture of cis and trans norcamphoric acid comprising providing an aqueous emulsion capable of retaining norbornylene in suspension and containing water as the sole participating solvent, simultaneously adding thereto norbornylene and ozone in susbtantially equimolar amounts, said norbornylene being added as an aqueous emulsion, permitting the ozone and norbornylene to react at a temperature of 15–55° C. to form a water-soluble low molecular weight ozonation product, heating the solution containing the ozonation product to a temperature between about 50–90° C., oxidizing the ozonation product by treating said solution with a stream of air at a rate sufficient to saturate said solution, and recovering from the reaction mixture norcamphoric acid in the form of a mixture of cis and trans isomers, the ratio of cis to trans isomer in the mixture being 6–10:1.

5. Method according to claim 4 wherein said aqueous emulsion contains up to 5% by weight of a saturated aliphatic hydrocarbon which is inert to ozone attack and which serves to promote the solubility of ozone and norbornylene in said aqueous emulsion.

References Cited in the file of this patent

UNITED STATES PATENTS

| | | |
|---|---|---|
| 2,963,487 | Perry | Dec. 6, 1960 |
| 2,969,376 | Perry | Jan. 24, 1961 |

FOREIGN PATENTS

| | | |
|---|---|---|
| 741,739 | Great Britain | Dec. 14, 1955 |

OTHER REFERENCES

Perry: J. Org. Chem. (London), vol. 24 (1959), pages 829–33.

Bailey: Chemical Rev., vol. 58 (1958), page 925.

UNITED STATES PATENT OFFICE
CERTIFICATE OF CORRECTION

Patent No. 3,126,410              March 24, 1964

Samuel C. Temin et al.

It is hereby certified that error appears in the above numbered patent requiring correction and that the said Letters Patent should read as corrected below.

Column 1, line 36, for "immediate" read -- intermediate --; column 2, line 7, for "980° C." read -- 98° C. --; line 56, after "to" insert -- be --; column 5, TABLE I, in the heading to the third column thereof, for "Degrees D" read -- Degrees C --.

Signed and sealed this 12th day of January 1965.

(SEAL)
Attest:

ERNEST W. SWIDER
Attesting Officer

EDWARD J. BRENNER
Commissioner of Patents